United States Patent
Argereu

[11] 3,828,630
[45] Aug. 13, 1974

[54] SOUND DEADENING MEANS FOR USE ON A BAR FEEDING AND BAR WORKING MACHINE

[76] Inventor: William Argereu, Hickory Dr., North Scituate, R.I. 02857

[22] Filed: Jan. 9, 1973

[21] Appl. No.: 322,140

Related U.S. Application Data
[62] Division of Ser. No. 159,672, July 6, 1971.

[52] U.S. Cl.................. 82/2.5, 82/38 A, 214/1.5
[51] Int. Cl............................................ B23b 13/00
[58] Field of Search............ 82/2.5, 2.7, 34 B, 34 R, 82/38 A; 408/143; 214/1.1, 1.2, 1.4, 1.5, 3

[56] References Cited
UNITED STATES PATENTS
1,506,108  8/1924  Brophy.............................. 82/38 R
2,809,420  10/1957  Bechler.............................. 214/1.5
3,122,384  2/1964  Luenberger..................... 308/DIG. 7
3,162,315  12/1964  Holden............................ 82/38 A X Primary Examiner—Andrew R. Juhasz
Assistant Examiner—Leon Gilden
Attorney, Agent, or Firm—Barlow & Barlow

[57] ABSTRACT

One or more resilient discs having an opening in the center to receive therethrough an elongated bar stock which is to be fed into and worked upon by a machine tool such, for instance, as a screw machine and which serves to deaden the sound caused by a vibration of the bar in being fed into the machine.

8 Claims, 5 Drawing Figures

PATENTED AUG 13 1974  3,828,630

SOUND DEADENING MEANS FOR USE ON A BAR FEEDING AND BAR WORKING MACHINE

CROSS REFERENCE TO RELATED APPLICATION

This application is a division of my co-pending application Ser. No. 159,672, filed July 6, 1971.

BACKGROUND OF THE INVENTION

In the use of machines such as screw machine the bar or stock which is fed to the machine to be worked upon by various tools of the machine vibrates to such an extent that the sound caused by the vibration is objectionable and various means, such as guides for the stock through which it is fed or springs such as shown in U.S. Pat. No. 1,935,999 which engage a stock, are sometimes used to deaden the sound of vibration of the stock. These are only partially satisfactory.

SUMMARY OF THE INVENTION

I have found that by use of resilient discs provided with a hole to snugly fit upon the bar and rotate therewith as the stock is fed into the chuck which holds the bar to be acted on by the tools of the machine is simple and much more effective for deadening the sound and polyurethane which has the qualities of toughness and resilience is a fine material for this use.

DESCRIPTION OF THE PREFERRED EMBODIMENT

With reference to the drawings 10 designates the bar stock which is to be fed and worked upon in the machine. It is hexagonal in cross section. A tube 11 of a size somewhat larger than the stock serves as a conduit through which the stock 10 is fed. Any convenient feeding means may be provided.

Figure 1:
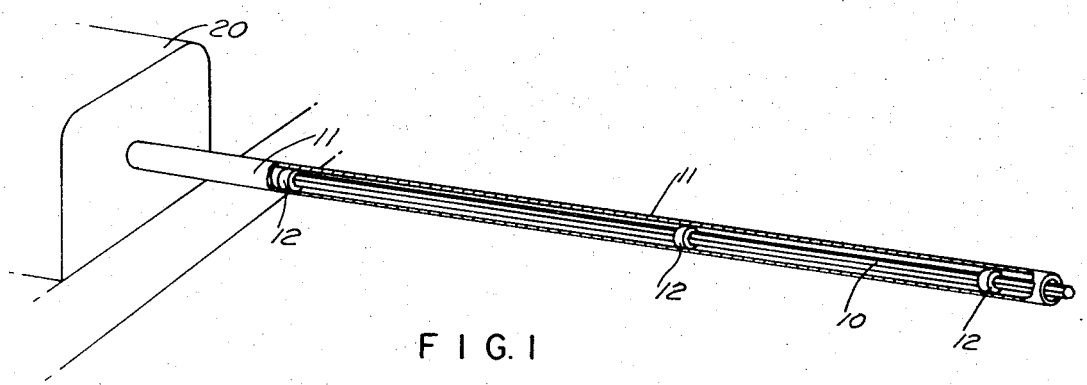
FIG. 1 is a perspective view showing a portion of a machine with a tube through which the stock is fed as broken away with the stock therein and the discs of this invention mounted on the stock.
Figure 2:
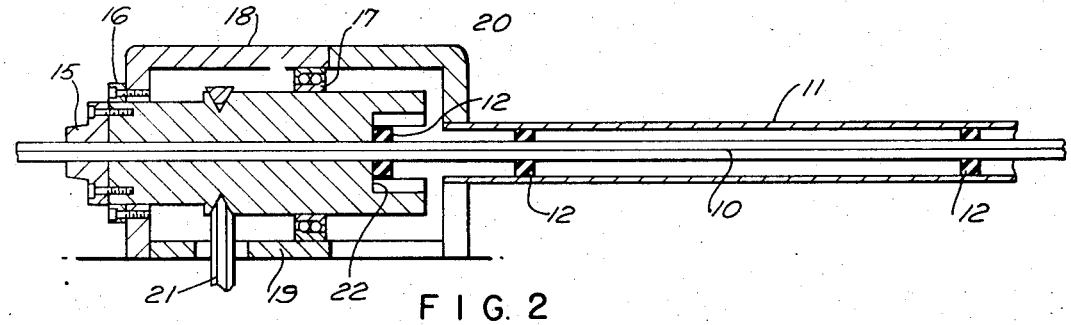
FIG. 2 is a sectional view illustrating one of these discs as engaging the rotary drive for the stock.
Figure 4:
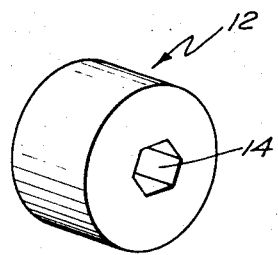
FIG. 4 is a perspective view of one of the discs with an opening therein of a size and shape to fit the bar stock.
Figure 5:
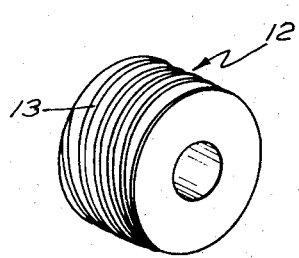
FIG. 5 is a similar view of modified hole therein and outer surface.

The dampening means of this invention are shown at 12 and in FIG. 1 are spaced along the bar at convenient locations which may be a few feet apart. Each of these discs 12 is generally circular in shape as shown in FIGS. 4 and 5 with an opening 14 in its center which is hexagonal in shape to fit the hexagonal shape of the stock and is of a size so that the disc hole must be stretched slightly in order to receive the stock. The axial dimension of the disc is substantially one-half to twice the diameter of the bar work upon which it is positioned and is of a diameter itself of three or four times the diameter of the bar on which it is positioned. This disc is molded from polyurethane which in some cases may include graphite molded into the polyurethane so that it will be self-lubricating. The polyurethane, however, provides excellent wear resistance and it is also oil resistant. The durometer of the disc will vary from 50–90 although I have found that between 70 and 80 is most satisfactory.

These discs may be of various sizes depending upon the diameter of the stock worked upon which may vary anywhere from ½ inch to 6 inches in diameter.

In most cases the outer surface of the disc may be threaded as shown at 13 in FIG. 5 so that the chips which are formed may be more easily discharged.

In the schematic showing the bar is gripped by a chuck 15 rotating in bearings 16, 17 supported by a casing 18 and base 19 having a hinged cover 20 at the rear portion thereof. The bar is released by chuck 15 and fed by any suitable means in a known manner. The chuck is driven by belt 21.

Figure 3:
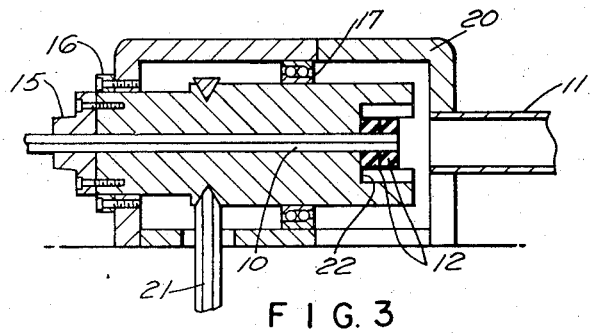
FIG. 3 is a view similar to FIG. 2 but illustrating the last end of the stock.

As the bar with the discs 12 thereon is fed to the left as shown in the drawing, the discs will engage a stop as at 22 and will slide along the bar as the same is fed to its working position. Thus there is provided one of these discs 12 up to the very end of the bar stock as illustrated in FIG. 3.

I claim:

1. In combination with a machine having tools operating upon a bar from which the work article is formed including a tube through which the bar is fed, a chuck for gripping the bar, a non-metallic resilient member of a size to slidably frictionally fit the tube and having a central opening with walls slidably frictionally gripping said bar to a degree greater than the frictional fit of said member in said tube so as to move and rotate therewith as the bar is fed, means for feeding the bar to cause said member to move with the bar through the tube toward said chuck, a stop to engage said member and cause the bar to move through said member as further feeding occurs.

2. The combination of claim 1 wherein there are a plurality of members spaced along said bar.

3. As set forth in claim 1 wherein said opening is of polygonal shape to fit a work bar of similar shape for rotation therewith.

4. As set forth in claim 1 wherein said member has a durometer of 50–90.

5. As set forth in claim 1 wherein said member has a durometer of 70–80.

6. As set forth in claim 1 wherein said member has a self-lubricant therein.

7. As set forth in claim 6 wherein said self-lubricant is graphite.

8. As set forth in claim 1 wherein the outer surface of the members is threaded.

* * * * *